United States Patent
Chandra et al.

(10) Patent No.: US 11,999,487 B2
(45) Date of Patent: Jun. 4, 2024

(54) AIRCRAFT SEAT WITH MOVEABLE ARMREST

(71) Applicant: Safran Seats GB Limited, Cwmbran (GB)

(72) Inventors: Naval Chandra, Cwmbran (GB); Daniel Haikney, Cwmbran (GB)

(73) Assignee: SAFRAN SEATS GB LIMITED, Cwmbran (GB)

( * ) Notice: Subject to any disclaimer, the term of this patent is extended or adjusted under 35 U.S.C. 154(b) by 255 days.

(21) Appl. No.: 17/617,299

(22) PCT Filed: Jun. 9, 2020

(86) PCT No.: PCT/GB2020/051393
§ 371 (c)(1),
(2) Date: Dec. 7, 2021

(87) PCT Pub. No.: WO2020/249938
PCT Pub. Date: Dec. 17, 2020

(65) Prior Publication Data
US 2022/0250752 A1 Aug. 11, 2022

(30) Foreign Application Priority Data

Jun. 11, 2019 (GB) ..................................... 1908294

(51) Int. Cl.
*B64D 11/06* (2006.01)
*A47C 1/03* (2006.01)
*A47C 1/032* (2006.01)

(52) U.S. Cl.
CPC ............ *B64D 11/0644* (2014.12); *A47C 1/03* (2013.01); *A47C 1/0303* (2018.08)

(58) Field of Classification Search
CPC ...... B64D 11/0644; A47C 1/03; A47C 1/0303
See application file for complete search history.

(56) References Cited

U.S. PATENT DOCUMENTS

| | | | | |
|---|---|---|---|---|
| 4,881,778 A | * | 11/1989 | Stephenson | B60N 2/753 297/411.39 |
| 5,908,221 A | * | 6/1999 | Neil | A47C 1/03 297/411.36 |

(Continued)

FOREIGN PATENT DOCUMENTS

| CN | 207241509 U | 4/2018 |
|---|---|---|
| DE | 3216931 A1 | 1/1984 |

(Continued)

OTHER PUBLICATIONS

International Patent Application No. PCT/GB2020/051393, International Search Report and Written Opinion, dated Nov. 4, 2020.

(Continued)

*Primary Examiner* — Rodney B White
(74) *Attorney, Agent, or Firm* — Kilpatrick Townsend & Stockton LLP

(57) ABSTRACT

An aircraft seat (1) is disclosed. The aircraft seat (1) comprises a seating surface (51), an armrest (7), and a gas strut (9) configured such that the armrest (7) can be moved between a raised position a lowered position in which an armrest surface (71) is substantially level with the seating surface (51). The gas strut (9) comprises a switch (92) with an unlocked configuration in which the stroke of the gas strut (9) can be adjusted and a locked configuration for locking the stroke of the gas strut (9) so that the armrest (7) can be held at any position between the raised position and the lowered position. A trigger (117) is configured to move the switch (92) between the locked and unlocked configurations upon actuation of an actuatable member (111) that is located upon a surface of the aircraft seat (1).

13 Claims, 4 Drawing Sheets

(56) References Cited

U.S. PATENT DOCUMENTS

| | | | |
|---|---|---|---|
| 6,598,934 B1 * | 7/2003 | Anderson | B60N 3/002 |
| | | | 297/145 |
| 8,070,233 B2 * | 12/2011 | Schumacher | B60N 2/753 |
| | | | 297/411.32 X |
| 10,556,690 B2 * | 2/2020 | McGreevy | B60N 2/77 |
| 10,870,489 B2 * | 12/2020 | Dowty | B60N 2/77 |
| 10,882,428 B2 * | 1/2021 | Kim | B60N 2/24 |
| 2006/0290190 A1 * | 12/2006 | Zuccato | A47C 1/03 |
| | | | 297/411.36 |
| 2007/0096531 A1 * | 5/2007 | Bruns | B60N 2/77 |
| | | | 297/411.36 |
| 2017/0101188 A1 * | 4/2017 | Augé | B64D 11/0649 |

FOREIGN PATENT DOCUMENTS

| | | |
|---|---|---|
| DE | 202005020879 U1 | 11/2006 |
| DE | 202012003042 U1 | 6/2013 |
| EP | 1577152 A2 | 9/2005 |

OTHER PUBLICATIONS

United Kingdom Patent Application No. 1908294.0, Search Report, dated Oct. 24, 2019.

* cited by examiner

AIRCRAFT SEAT WITH MOVEABLE ARMREST

FIELD OF THE INVENTION

The present invention concerns aircraft seats. More particularly, but not exclusively, this invention concerns an aircraft seat with a moveable armrest.

BACKGROUND OF THE INVENTION

Aircraft seats with moveable armrests arm known. For example, the "Cirrus" business class seat produced by Safran Seats comprises an armrest that can be fixed at either a raised position or a lowered position with respect to the seat pan, and is moveable between the raised position and the lowered position by means of a gas strut.

Some jurisdictions legally require the aisle-side armrest of an aircraft seat to be moveable to a position that allows easy access to the aircraft seat for disabled passengers. As such, aircraft seat manufacturers now see a moveable armrest as mandatory part of the aircraft seat.

A moveable armrest advantageously comprises a means of moving the armrest that is simple to operate and reliable. Furthermore, the armrest should be configured in an ergonomic way to provide maximum comfort for the passenger of the aircraft seat.

The present invention seeks to mitigate the above-mentioned problems.

SUMMARY OF THE INVENTION

The present invention provides an aircraft seat comprising a seat pan, an armrest comprising an armrest surface, and a gas strut, wherein the gas strut is coupled at a first end of the gas strut to the armrest and coupled at a second end of the gas strut to a substructure of the aircraft seat such that the armrest can be moved between a raised position with respect to the seat pan and a lowered position in which the armrest surface is substantially level with the seat pan by extending and retracting the stroke of the gas strut. The gas strut comprises a switch with an unlocked configuration in which the stroke of the gas strut can be adjusted, thereby allowing movement of the armrest to any position between the raised position and lowered position, and with a locked configuration for locking the stroke of the gas strut so that the armrest can be held at any position between the raised position and the lowered position. The aircraft seat further comprises a mechanical linkage comprising an actuatable member located on a surface of the aircraft seat and a trigger configured to move the switch between the locked configuration and the unlocked configuration upon actuation of the actuatable member.

Locking gas struts, also known as locking gas springs, are well known. Typically, a locking gas strut comprises a barrel and a piston rod wherein the stroke of the gas strut is able to be retracted and extended by moving the piston rod into and out of the barrel. Gas struts are typically configured such that the resilient bias of the gas strut pushes the piston rod out of the barrel, therefore if no external force is placed on the gas strut, the equilibrium configuration of the gas strut is one in which the piston rod is fully extended out of the barrel. Locking gas struts comprise a switch that operates a valve within the gas strut so that the piston rod can be locked at any stroke position between its fully extended and fully retracted position.

The aircraft seat according to the invention uses a locking gas strut to effect movement of the armrest of the aircraft seat between a raised position and a lowered position. The switch of the gas strut is configured to be biased towards the locked configuration, so unless the actuatable member is actuated, the armrest will be fixed at or between the raised and lowered positions. To move the armrest to the lowered position, a user simply actuates the actuatable member to move the switch of the gas strut to the unlocked configuration and pushes the armrest against the resilient bias of the gas strut until the armrest surface is substantially level with the seat pan. It is, however, within the scope of the invention for the armrest surface to be lowerable to a level below the seat pan. Such a configuration provides easy access to the aircraft seat for disabled people or those with reduced mobility.

To move the armrest to the raised position, in which a user of the aircraft seat can sit in the seat with their arm resting upon the armrest surface, the actuatable member is actuated to move the switch of the gas strut to the unlocked configuration. This releases the valve within the gas strut and allows the stroke of the gas strut to extend under the force of the resilient bias of the gas strut, if no opposing force is applied to the armrest.

Furthermore, the locking function of the gas strut means that the armrest can be held at any position between the raised and lowered positions when moving the armrest simply by releasing the actuatable member so that the gas strut switch returns to the locked configuration. This means that the armrest surface can be moved to a height relative to the seat pan that is suitable for the particular body size of the passenger of the aircraft seat. Such a configuration is advantageous for comfortably accommodating passengers of various sizes within the aircraft seat. It should be understood that the word "releasing" in this context means moving the actuatable member from its actuated state to its unactuated state in which the gas strut switch is not engaged and the stroke of the gas strut is therefore locked.

The armrest surface may translate along an axis oriented substantially perpendicular to the armrest surface as the armrest is moved between the raised position and the lowered position. The armrest surface may translate along a substantially vertical direction. Preferably, the actuatable member is a button located on a surface of the armrest. The actuatable member may be positioned on a side surface of the armrest. The side surface of the armrest may be positioned at an angle to armrest surface.

Advantageously, the mechanical linkage comprises an elongate tension member coupled at a first end to the actuatable member and coupled at a second end to the trigger such that actuation of the actuatable member exerts a tensile force on the tension member and causes the tension member to pull the trigger into engagement with the gas strut switch to move the gas strut switch from the locked configuration to the unlocked configuration. The mechanical linkage may be coupled to and moveable with the armrest. The mechanical linkage may be mounted upon an underside of the armrest surface. The underside of the armrest surface may be positioned beneath the armrest surface. The underside of the armrest surface may define a plane that is substantially parallel and spaced apart from a plane defined by the armrest surface. Advantageously, the tension member is coupled to and runs along an underside of the armrest surface. The tension member may run in a plane that is substantially parallel to a plane defined by the arm rest surface.

Preferably the trigger is rotatably mounted to the aircraft seat. Advantageously, actuation of the actuatable member causes the tension member to pull the trigger such that it rotates into engagement with the gas strut switch to move the switch between the locked configuration and the unlocked configuration. Preferably the trigger is rotatably mounted to a bracket. The bracket may be mounted upon the armrest. The bracket may be mounted upon an underside of the armrest surface.

Preferably, the tension member is a Bowden cable or a substantially rigid rod. It will be understood that a Bowden cable, sometimes also referred to as a "mech cable", is a flexible cable of relatively high tensile stiffness that is used to transmit a force by applying a tensile force to the cable.

In a preferred embodiment, the tension member is a Bowden cable held at a first end by a first bracket and held at a second end by a second bracket. The first and second brackets may be fastened to an underside of the armrest surface. The first bracket may be spaced apart from the second bracket along the underside of the armrest surface. Advantageously, the trigger may be mounted to one of the first or second brackets. Alternatively, the trigger may be mounted to a third bracket.

The mechanical linkage may further comprise a pivot linkage coupled at a first end to the actuatable member and coupled at a second end to the tension member. Preferably the pivot linkage is configured such that actuation of the actuatable member causes the pivot linkage to rotate and exert a tensile force on the tension member. Exerting a tensile force on the tension member may pull the trigger into engagement with the gas strut switch. The pivot linkage may be pivotally mounted to an underside of the armrest surface.

Preferably, at a first distal end of the gas strut the piston rod is coupled to an underside of the armrest surface, and at a second, opposite distal end of the gas strut the barrel is coupled to the substructure of the aircraft seat. Advantageously, the switch of the gas strut is located on the piston rod, at the first distal end of the gas strut.

The aircraft seat preferably comprises a backrest. The gas strut may be positioned between the actuatable member and the backrest. The switch of the gas strut may be located at the distal end of the piston rod. The trigger may be positioned directly above the switch. The actuatable member may be spaced apart from the switch by approximately 21 centimetres. The actuatable member and the switch may be spaced apart in a plane that is parallel to the armrest surface.

Preferably the range of movement of the armrest surface between the raised and lowered positions is at least approximately 13 centimetres. More preferably, the range of movement of the armrest surface between the raised and lowered positions is at least approximately 15 centimetres, and even more preferably approximately 18 centimetres.

DESCRIPTION OF THE DRAWINGS

Embodiments of the present invention will now be described by way of example only with reference to the accompanying schematic drawings of which.

DETAILED DESCRIPTION

Figure 1:
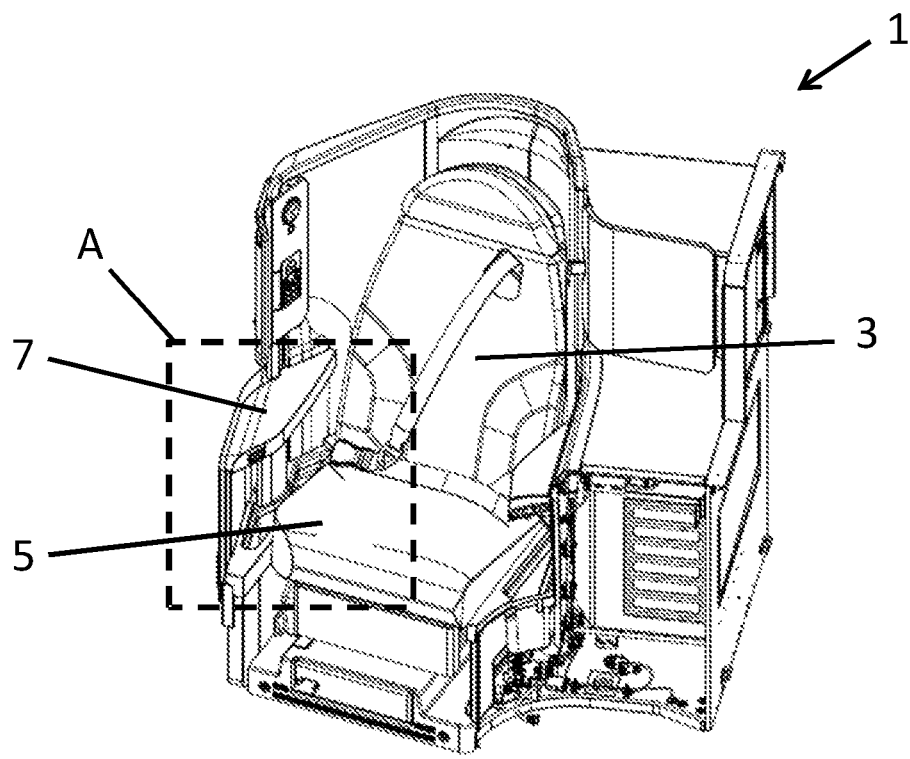
FIG. 1 shows an aircraft seat according to a first embodiment of the invention with the armrest of the aircraft seat in a raised position.

An aircraft seat 1 according to an embodiment of the invention is shown in FIG. 1. The aircraft seat 1 comprises a back rest 3, a seat pan 5, and an armrest 7. The armrest 7 comprises an armrest surface 71 upon which a user of the aircraft seat 1 is able to position their arm when seated upon the seating surface 51 of the seat pan 5. The armrest 7 is moveable between a raised position, shown in FIG. 1 and FIG. 2, and a lowered position, shown in FIG. 3, in which the armrest surface 71 is approximately level with the seating surface 51 of the seat pan 5. The armrest 7 is moveable to any position between the raised and lowered positions by means of the locking gas strut 9 and mechanical linkage 11 arrangement shown in FIG. 4, which is positioned beneath the armrest surface 71. The gas strut 9 is surrounded by a housing 12 that contains the gas strut 9 when the armrest 7 is in the raised position, as shown in FIG. 2.

The gas strut 9 comprises barrel 93, a piston rod 91, and a release pin 92 at the distal end of the piston rod 91. The gas strut 9 is moveable between an extended stroke configuration in which the piston rod 91 projects out of the barrel 93 in vertically upwards direction relative to the aircraft seat, shown in FIG. 4, and a retracted stroke configuration (not shown), in which the piston rod 91 is contained substantially within the barrel 93. The release pin 92 acts as a switch that operates a valve within the gas strut 9 to lock the gas strut 9 at any stroke configuration between the extended and retracted configurations, as will be well understood by the skilled person. The default position of the release pin 92 is a locked position in which the stroke of the gas strut 9 is locked. To move the piston rod 91 from the extended configuration to the retracted configuration, the release pin 92 must be actuated to an unlocked position and the piston rod 91 must be pushed into the barrel 93, against the resilient bias of the gas strut 9. The gas strut 9 can be held at any position between its extended position and its retracted position by releasing the release pin 92 so that it returns to the unlocked position. When the release pin 92 is actuated to the unlocked position and no force is applied to the gas strut 9, the resilient bias of the gas strut 9 pushes the piston rod 91 to its extended stroke position shown in FIG. 4.

As can be seen in FIG. 1, the gas strut 9 is enclosed within a housing 12 positioned centrally below the armrest surface 71. Rather than providing a means of operating the moveable armrest 7 in the immediate vicinity of the gas strut 9, which is positioned below where the elbow of a passenger might rest, it is more ergonomic and convenient for the passenger of the aircraft seat 1 if the means of operating the moveable armrest 7 is provided in the vicinity of where their hand might normally rest when seated in the aircraft seat 1.

Figure 2:
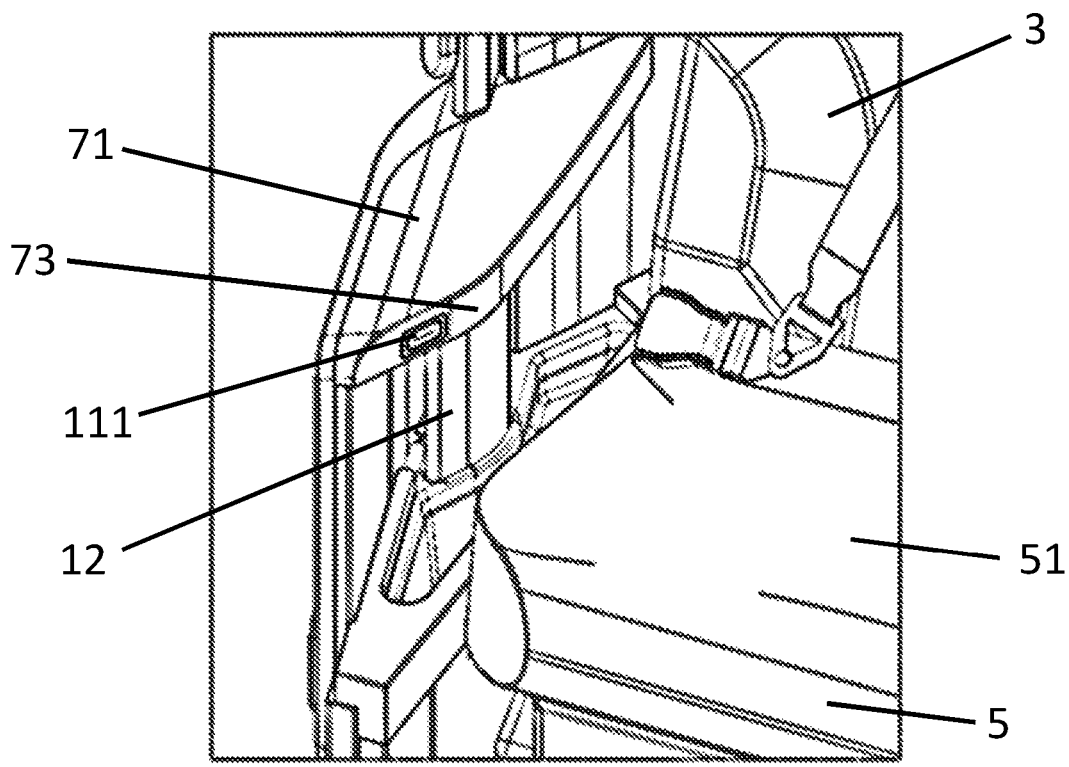
FIG. 2 is a detailed view of the part of the aircraft seat contained within the box labelled A in FIG. 1.
Figure 3:
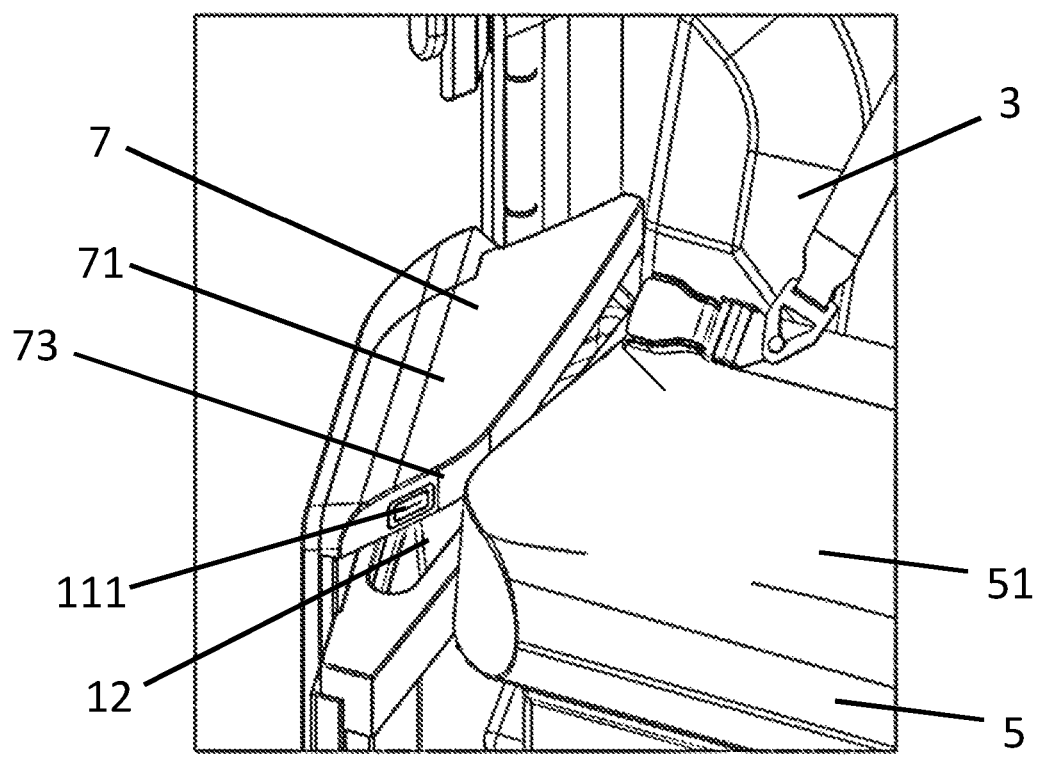
FIG. 3 corresponds to the view of FIG. 2 but with the armrest in a lowered position in which the armrest surface is substantially level with the seat pan.
Figure 4:
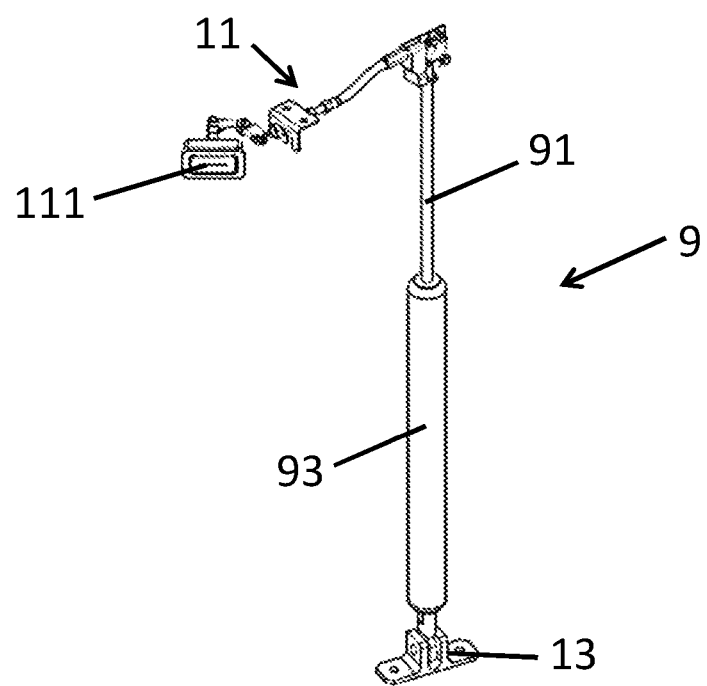
FIG. 4 shows in isolation the mechanical linkage and locking gas strut arrangement that is used to move the armrest of the aircraft seat of FIG. 1 between the raised and lowered positions

As such, a button 111 for operation of the gas strut 9 is provided on a side surface 73 of the armrest 7, towards the front end of the aircraft seat 1 in a position close to where the hand of a passenger of the aircraft seat 1 would be naturally be positioned when seated in the aircraft seat 1, as can be seen in FIG. 2 and FIG. 3. Upon pushing the button 111, an actuation force is transmitted to the release pin 92 via a mechanical linkage 11 that is coupled to and runs along an underside of the armrest surface 71, between the button 111 and gas strut 9, in a plane substantially parallel to the arm rest surface 71.

At a first, upper distal end of the gas strut, the distal end 97 of the piston rod 91 is coupled to the mechanical linkage 11 that is fixed to the underside of the armrest 7 via a first bracket 116 and a second bracket 118. At a second, lower distal end of the piston rod 9, the barrel 93 is fixed to a bracket 13 forming part of the aircraft seat 1 sub structure.

Figure 5:
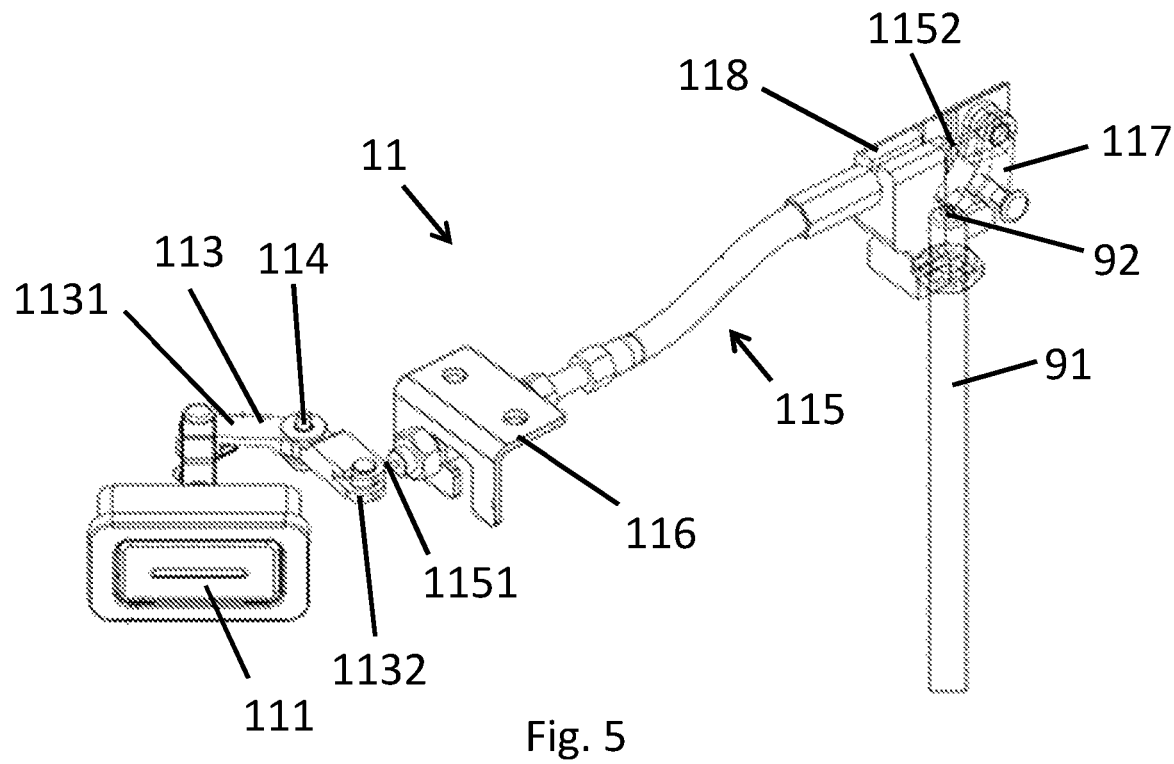
FIG. 5 is a detailed view of the mechanical linkage shown in FIG. 4.
Figure 6:
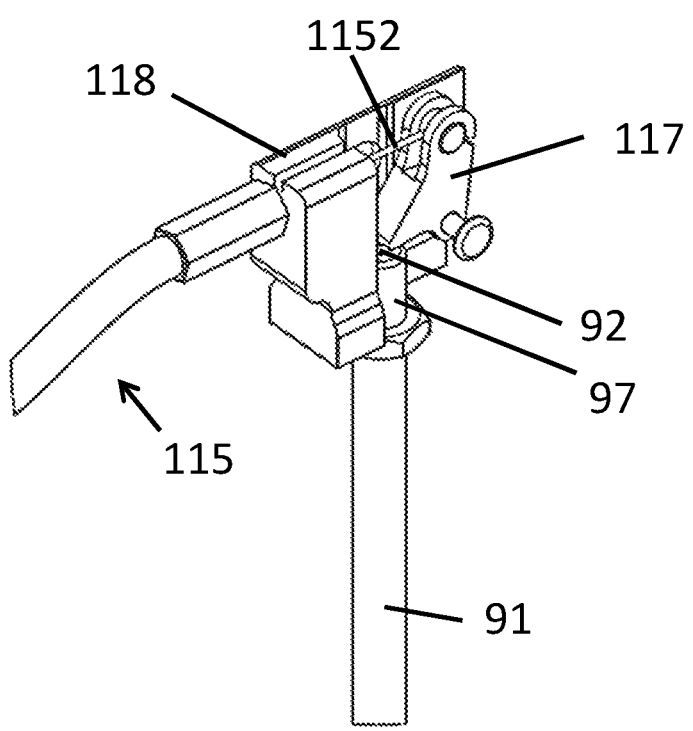
FIG. 6 is a detailed view of the trigger arrangement of the mechanical linkage shown in FIG. 4 which shows the trigger as pulled into engagement with the release pin of the gas strut.

As mentioned, the purpose of the mechanical linkage 11 is to provide a means of transmitting an actuation force provided by a passenger to the release pin 91 of the gas strut 9. As such, the mechanical linkage 11, which is shown in more detail in FIG. 5 and FIG. 6, is configured so that pressing a button 111 actuates a trigger 117 of the mechanical linkage into engagement with the release pin 92 of the gas strut. In addition to the button 111 and trigger 117, the mechanical linkage 11 also comprises an elongate pivot link 113 that is pivotally mounted to the underside of the armrest 7 at the centre of the pivot link 117 centre via a pin 114. At a first distal end 1131 of the pivot link 113, the pivot link 113 is coupled to the button 111 such that when the button 111 is depressed, the pivot link 113 is pushed and rotated about the pin 114. At a second distal end 1132 of the pivot link 113, the pivot link 113 is coupled to a first end 1151 of a Bowden cable 115 that is held in place by the first bracket 116. At the second, opposite end 1152 of the Bowden cable 115, the Bowden cable 115 is held in place by the second bracket 118 and is coupled to a trigger 117 that is rotatably mounted upon the second bracket 118. The Bowden cable 115 is configured such that when it is pulled, the trigger 117 is rotated into engagement with the release pin 92 of the gas strut 9. The mechanical linkage 11 is therefore configured such that when the button 111 is pressed, the pivot link 113 is pushed and rotated about its pivot point (clockwise as shown in FIG. 5), rotation of the pivot link pulls on the Bowden cable thereby pulling and rotating the trigger into engagement with the release pin 92 to actuate the release pin 92.

Configured as such, a passenger of the aircraft seat 1 can move the armrest 7 downwardly with respect to the seat pan to a lowered position by pressing the button 111 to move the release pin 92 to its unlocked position and then pushing the armrest 7 downwardly, against the resilient bias of the gas strut 7. The gas strut 7 can be locked in any given position by releasing the button 111 so that the armrest surface 71 can be fixed at any position between its raised position, shown in FIG. 2 and its lowered position, shown in FIG. 3. In order to return the armrest surface 71 to its raised position, the passenger simply presses the button 111 to move the release pin 91 to its unlocked position, which causes the stroke of the gas strut 9 to fully extend under the resilient bias of the gas strut 9.

Figure 7:
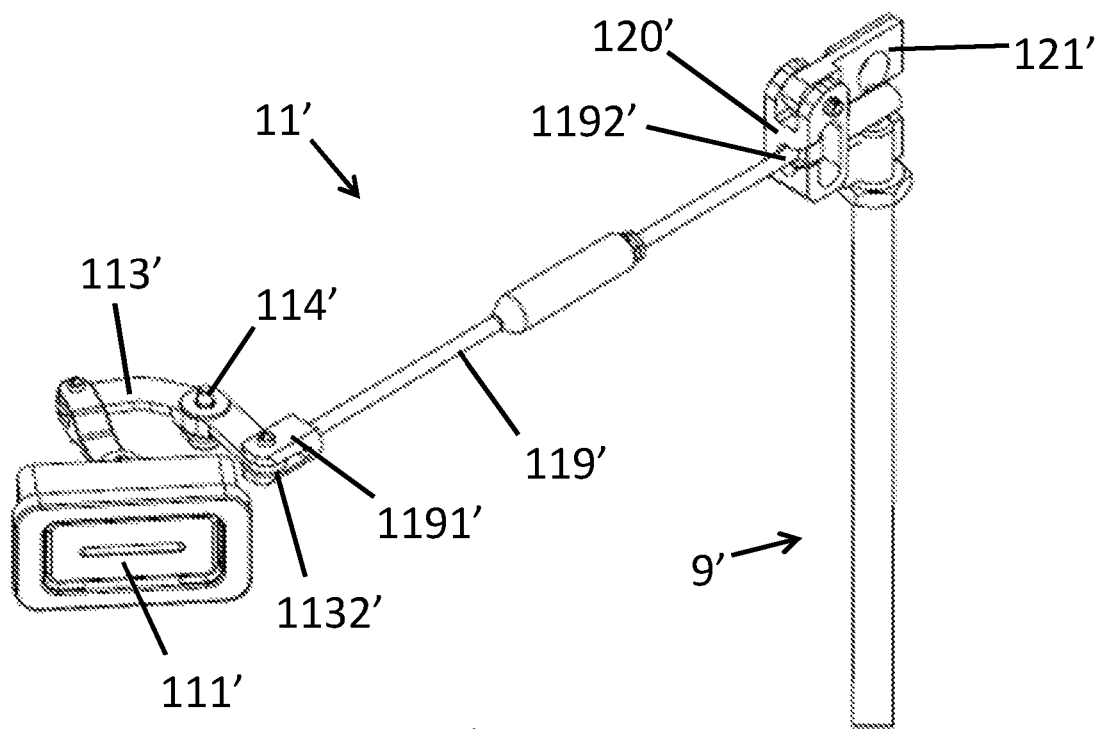
FIG. 7 is a detailed view of a mechanical linkage arrangement that is used to move an armrest of an aircraft seat according to a second embodiment of the invention.
Figure 8:
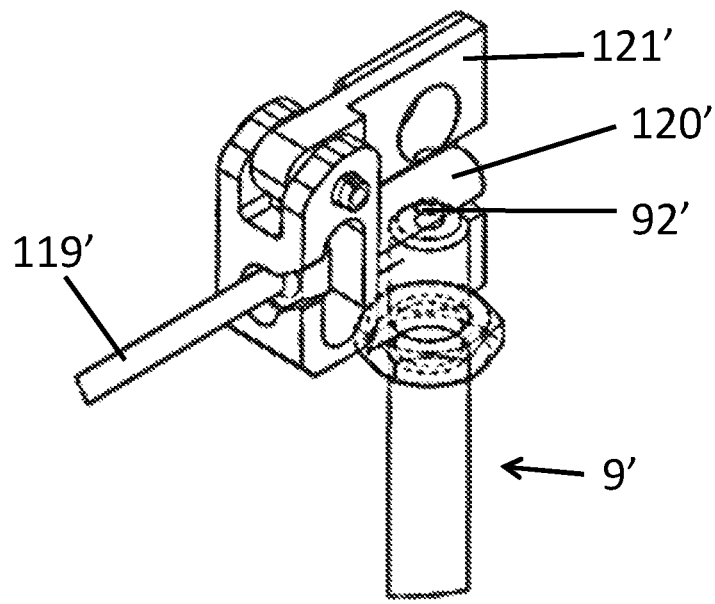
FIG. 8 is a detailed view of the trigger of the mechanical linkage shown in FIG. 7.

The mechanical linkage 11' of an aircraft seat according to a second embodiment of the invention is shown in FIG. 7 and FIG. 8. The mechanical linkage 11' comprises a button 111' and a pivot link 113' configured in substantially the same way as the mechanical linkage of the first embodiment of the invention. However, the pivot linkage 11' comprises a substantially rigid adjustable steel rod 119' in place of a Bowden cable to effect actuation of the release pin 92' of the gas strut 9'. In this embodiment, the pivot link 113' is connected at its second distal end 1132' to a clevis 1191' located at a first distal end of the rod 119'. At its second distal end 1192', the rod 119' is received within a trigger 120' that is pivotally mounted upon a bracket 121' that is fixed to the underside of the armrest. The rod 119' is configured such that when it is pulled, the trigger 120' is rotated into engagement with the release pin 92' of the gas strut 9'. The mechanical linkage 11' is therefore configured in this second embodiment of the invention such that when the button 111' is pressed, the pivot link 113' is rotated about its pivot point 114' (clockwise as shown in FIG. 7), rotation of the pivot link 113' pulls on the rod 119' thereby pulling and rotating the trigger 120' into engagement with the release pin to actuate the release pin 92'. A passenger of the aircraft seat is therefore able to move the armrest upwardly and downwardly using the button 111' in substantially the same way as described for the first embodiment of the invention.

Whilst the present invention has been described and illustrated with reference to particular embodiments, it will be appreciated by those of ordinary skill in the art that the invention lends itself to many different variations not specifically illustrated herein. For example, in other embodiments of the invention, the locking gas strut is oriented such that the piston rod projects out of the barrel in a vertically downwards direction, so that the barrel of the gas strut is located above the piston rod.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft seat comprising a seating surface, an armrest comprising an armrest surface, a mechanical linkage, and a gas strut, wherein:

the gas strut is coupled at a first end of the gas strut to the armrest and is coupled at a second end of the gas strut to a substructure of the aircraft seat such that the armrest can be moved between a raised position with respect to the seating surface and a lowered position in which the armrest surface is substantially level with the seating surface by extending and retracting the stroke of the gas strut;

the gas strut comprises a switch with an unlocked configuration in which the stroke of the gas strut can be adjusted, thereby allowing movement of the armrest to any position between the raised position and lowered position, and with a locked configuration for locking the stroke of the gas strut so that the armrest can be held at any position between the raised position and the lowered position;

the mechanical linkage comprises an actuatable member located on a surface of the aircraft seat, a trigger configured to move the switch between the locked configuration and the unlocked configuration, and a tension member coupled at a first end to the actuatable member and coupled at a second end to the trigger;

the tension member is coupled to and runs along an underside of the armrest surface;

the trigger is rotatably mounted to a bracket, and the bracket is mounted to the armrest; and actuation of the actuatable member exerts a tensile force on the tension member and causes the tension member to pull and rotate the trigger into engagement with the gas strut switch to move the gas strut switch from the locked configuration to the unlocked configuration.

2. An aircraft seat according to claim 1, wherein the armrest surface translates along an axis oriented substantially perpendicular to the armrest surface as the armrest is moved between the raised position and the lowered position.

3. An aircraft seat according to claim 1, wherein the actuatable member is a button located on a surface of the armrest.

4. An aircraft seat according to claim 1, wherein the tension member is a Bowden cable or a substantially rigid rod.

5. An aircraft seat according to claim 4, wherein the bracket is a first bracket, the tension member is a Bowden cable, and the Bowden cable is held at a first end by the first bracket and held at a second end by a second bracket.

6. An aircraft seat according to claim 5, wherein the first and second brackets are coupled to an underside of the armrest.

7. An aircraft seat according to claim 1, wherein the mechanical linkage further comprises a pivot linkage coupled at a first end to the actuatable member and coupled at a second end to the tension member, wherein the pivot linkage is configured such that actuation of the actuatable member causes the pivot linkage to rotate and exert the tensile force on the tension member.

8. An aircraft seat according to claim 1, wherein, at a first distal end of the gas strut, a piston rod of the gas strut is coupled to an underside of the armrest surface, and wherein, at a second, opposite distal end of the gas strut, a barrel of the gas strut is coupled to the substructure of the aircraft seat.

9. An aircraft seat according to claim 8, wherein the gas strut switch is located on the piston rod, at the first distal end of the gas strut.

10. An aircraft seat according to claim 1, the aircraft seat further comprising a backrest, wherein the gas strut is positioned between the actuatable member and the backrest.

11. An aircraft seat according to claim 1, wherein the range of movement of the armrest surface between the raised and lowered positions is at least approximately 13 centimeters.

12. An aircraft seat comprising a seating surface, an armrest comprising an armrest surface, a mechanical linkage, and a gas strut, wherein:

the gas strut is coupled at a first end of the gas strut to the armrest and is coupled at a second end of the gas strut to a substructure of the aircraft seat such that the armrest can be moved between a raised position with respect to the seating surface and a lowered position in which the armrest surface is substantially level with the seating surface by extending and retracting the stroke of the gas strut;

the gas strut comprises a switch with an unlocked configuration in which the stroke of the gas strut can be adjusted, thereby allowing movement of the armrest to any position between the raised position and lowered position, and with a locked configuration for locking the stroke of the gas strut so that the armrest can be held at any position between the raised position and the lowered position;

the mechanical linkage comprises an actuatable member located on a surface of the aircraft seat, a trigger configured to move the switch between the locked configuration and the unlocked configuration, and a tension member coupled at a first end to the actuatable member and coupled at a second end to the trigger;

the tension member is coupled to and runs along an underside of the armrest surface;

actuation of the actuatable member exerts a tensile force on the tension member and causes the tension member to pull the trigger into engagement with the gas strut switch to move the gas strut switch from the locked configuration to the unlocked configuration; and the mechanical linkage further comprises a pivot linkage coupled at a first end to the actuatable member and coupled at a second end to the tension member, wherein the pivot linkage is configured such that actuation of the actuatable member causes the pivot linkage to rotate and exert the tensile force on the tension member.

13. An aircraft seat comprising a seating surface, an armrest comprising an armrest surface, a mechanical linkage, and a gas strut, wherein:

the gas strut is coupled at a first end of the gas strut to the armrest and is coupled at a second end of the gas strut to a substructure of the aircraft seat such that the armrest can be moved between a raised position with respect to the seating surface and a lowered position in which the armrest surface is substantially level with the seating surface by extending and retracting the stroke of the gas strut;

the gas strut comprises a switch with an unlocked configuration in which the stroke of the gas strut can be adjusted, thereby allowing movement of the armrest to any position between the raised position and lowered position, and with a locked configuration for locking the stroke of the gas strut so that the armrest can be held at any position between the raised position and the lowered position;

the mechanical linkage comprises an actuatable member located on a surface of the aircraft seat, a trigger configured to move the switch between the locked configuration and the unlocked configuration, and a tension member coupled at a first end to the actuatable member and coupled at a second end to the trigger;

the tension member is coupled to and runs along an underside of the armrest surface;

actuation of the actuatable member exerts a tensile force on the tension member and causes the tension member to pull the trigger into engagement with the gas strut switch to move the gas strut switch from the locked configuration to the unlocked configuration; and at a first distal end of the gas strut, a piston rod of the gas strut is coupled to an underside of the armrest surface, and, at a second, opposite distal end of the gas strut, a barrel of the gas strut is coupled to the substructure of the aircraft seat.

* * * * *